Patented May 29, 1951

2,554,632

UNITED STATES PATENT OFFICE 2,554,632

PREPARATION OF PROTEIN DIGESTION PRODUCT

Naurice M. Nesset, Glenview, Ill., assignor to Baxter Laboratories, Inc., Morton Grove, Ill., a corporation of Delaware No Drawing. Continuation of application Serial No. 561,161, October 30, 1944. This application March 24, 1950, Serial No. 151,823

3 Claims. (Cl. 195—29)

This invention relates to a protein digestion product and the preparation thereof from mammalian blood, and more particularly to the preparation of a growth-supporting balanced mixture of protein digestion products particularly for use in parenteral therapy.

This application is a continuation of my abandoned application, Serial No. 561,161, entitled "Preparation of Protein Digestion Product" and filed October 30, 1944; that application was, in turn, a continuation-in-part of abandoned U. S. patent application, Serial No. 399,737, for "Preparation of Amino Acids," filed June 25, 1941.

In prior methods of hydrolyzing blood, mineral acids have usually been employed, and these acids tend to destroy some of the amino acids which are constituents of the blood proteins. The destruction of certain essential amino acids in such hydrolysis results in an unbalanced mixture of amino acids and protein digestion products, and the resultant product is therefore not as complete a mixture as is desired for parenteral use.

There has long been a need for a balanced mixture of amino acids and other protein digestion products for satisfying mammalian protein requirements and adapted for parenteral administration.

For parenteral therapy, it is important that the protein digestion product consist of a balanced mixture of protein digestion products and be free from any anaphylactic reaction. In the present process, the growth-supporting balanced mixture of digestion products of plasma or serum of blood is obtained by enzyme hydrolysis and is substantially free from whole or undigested proteins. Since it is extremely difficult to digest all of the proteins present in the mixture by enzyme hydrolysis, the present process contemplates the digestion by enzyme hydrolysis of the bulk of the protein present in the blood serum or plasma and the subsequent removal by coagulation of any whole or undigested proteins remaining in the digested mixture.

An object of the present invention is to treat blood serum or plasma under such conditions and with certain treating materials whereby the essential amino acids are preserved and recovered together with other digestion products in a balanced mixture especially suited for parenteral use. A further object is to provide a simple and effective process whereby certain proteolytic enzymes may be employed for converting products of blood serum or plasma into their constituent digestion products, optimum conditions being maintained for each of said enzymes or combination of enzymes. Still another object is to provide a simple method whereby the natural proteins occurring in the blood serum or plasma may be converted to a mixture of polypeptides and amino acids.

A further object of the invention is to treat blood to obtain plasma or serum therefrom and then subject the plasma or serum to enzyme hydrolysis and treat the hydrolyzed mixture to remove therefrom any remaining whole or undigested proteins.

Broadly, the process of the invention consists in treating mammalian blood to remove the formed elements therefrom, the formed elements being the corpuscles, and other materials which are separated from blood upon permitting the blood to settle for a period of time or by centrifugation. The portion of the blood remaining after the separation is a liquid portion which consists of plasma or serum. Plasma is the liquid portion obtainable from blood by mixing whole blood with an anti-coagulant and separating the liquid portion by centrifugation or settling. A satisfactory anti-coagulant is sodium citrate, although any suitable anti-coagulant may be employed. If no anti-coagulant is used, the blood will coagulate as well as settle, and the liquid portion obtained in this case by settling or centrifugation is serum rather than plasma.

To the portion of the blood from which the formed elements have been removed is added a sufficient quantity of a proteolytic enzyme to cause digestion of the blood proteins. Any suitable proteolytic enzyme may be used. For example, papain, erepsin, trypsin or pepsin may be used.

The hydrogen ion concentration most favorable for the action of the particular enzyme used should be maintained in the mixture. If papain is used, an acid medium may be employed, although papain is effective in hydrolyzing some proteins in an alkaline substrate. Pepsin may also be used in an acid substrate. On the other hand, erepsin and trypsin are most effective in an alkaline substrate. All of the above-mentioned enzymes, except pepsin, are effective for breaking down proteins into amino acids, while pepsin is effective for changing proteins into a mixture of peptones and polypeptides.

The hydrogen ion concentration of the mixture may be adjusted aseptically by adding the desired quantity of a sterile solution of a suitable alkali, such as sodium hydroxide, or a sterile solution of a suitable acid, such as, for example, hydrochloric acid, lactic acid, etc. Samples of the digestion mixture may be taken at intervals in order to determine the hydrogen ion concentration and maintain this concentration at the optimum value. The progress of the digestion may also be followed by suitable chemical or biological tests.

The mixture may be maintained during the digestion operation at a suitable temperature for the action of the specific enzyme used, usually about room temperature or slightly above.

The entire operation may be carried out aseptically. The blood may be drawn into a sterile container and, while maintained in sterile condition, the formed elements removed therefrom. To the sterile mixture may be added a sterile enzyme and the mixture maintained in sterile condition throughout the operation.

The digestion process is continued until the desired amount of amino acids has been produced. The digestion may be carried on until the bulk of the proteins have been digested, and preferably until practically all of the proteins have been digested. The digestion of the intermediate products formed by the protein hydrolysis, such as peptones, polypeptides, and peptides, may be extensive. Conversion may be carried on until the alpha amino nitrogen present in the mixture constitutes in excess of 40%, and preferably in the neighborhood of 50%, of the total nitrogen present. The alpha amino nitrogen may be determined by the Van Slyke method or formol titration, or by other suitable chemical tests. When the digestion is relatively complete as described above, the soluble constituents of the mixture may be separated from the insoluble constituents by filtration, centrifugation, or decantation. The soluble constituents containing the amino acids and other protein digestion products may also contain a very small quantity of undigested or whole protein.

The protein digestion mixture after separation form the insoluble constituents of the digestion process may be treated to coagulate any whole or undigested protein remaining in the mixture. This step may consist of heating the mixture at a pH of less than 7 at a temperature sufficiently high to denature the proteins and for a length of time sufficient to cause the proteins to coagulate. Preferably, the mixture is heated to a temperature in the neighborhood of 250° F. in an autoclave for a period of 20 minutes or more to coagulate the proteins at a pH of 5.7. After the proteins have been coagulated they are then separated from the mixture by filtration, centrifugation or the like.

Although any whole proteins remaining in the digestion product are denatured and coagulated by the heating of the mixture, this heating step does not denature or coagulate or materially affect the digestion products, such as the peptones, polypeptides, peptides, and amino acids. Accordingly, the heat treatment of the mixture to denature and coagulate the whole or undigested proteins is selective in removing these materials without affecting the remainder of the mixture.

To obtain the proper pH or hydrogen ion concentration, there may be added to the mixture either a suitable alkali, such as sodium hydroxide, or a suitable acid, such as hydrochloric acid.

If desired, the digestion product may be subjected to the heat treatment to coagulate the proteins before filtration or centrifugation, and a single process of filtration or centrifugation may be used in removing the insoluble materials resulting from the digestion together with coagulated proteins.

The heating of the mixture to coagulate whole proteins serves also to inactivate the enzymes.

The following is a specific example of the process of the invention: A quantity of mammalian blood in sterile condition is treated with an anti-coagulant and then subjected to centrifugation to remove the formed elements therefrom. To the remaining plasma is added a suitable quantity of a sterile enzyme, such as, for example, papain. The enzyme is thoroughly mixed with the plasma by mechanical means and a portion withdrawn for the purpose of determining the hydrogen ion concentration and for the determination of the required amount of acid or base to be added in order that the hydrogen ion concentration may be adjusted to the optimum pH for the enzyme digestion or hydrolysis. After making this analysis, the calculated amount of sterile hydrochloric acid is aseptically added to the container and thoroughly mixed with the mass. A pH in the neighborhood of 5.5 is desirable for the hydrogen ion concentration. The mixture is maintained at a temperature of about 40° C. for the period necessary to carry out the digestion. Usually this period will be a matter of days in the neighborhood, for example, of ten days, although in some instances digestion may proceed more rapidly. During the digestion process, a quantity of the mixture may be withdrawn and tested to determine the extent of the digestion. The hydrogen ion concentration may also be tested, and if it has been found to vary materially from the original hydrogen ion concentration a suitable amount of acid or alkali may be added to bring the hydrogen ion concentration to the desired value.

When tests of the digestion mixture indicate that the desired quantity of alpha amino nitrogen, such as 50%, is present, and that substantially all of the protein has been hydrolyzed, the mixture may be introduced into an autoclave and heated to a temperature in the neighborhood of 250° F. at a pH of approximately 5.7 until any whole or undigested protein has been coagulated. The mixture is then subjected to filtration or centrifugation to remove the insoluble constituents and the remaining mixture is found to consist of a solution of amino acids and other protein digestion products substantially free of whole or undigested proteins and having an alpha amino nitrogen content of approximately 50%.

The product of the invention provides a balanced mixture of protein digestion products for satisfying mammalian protein requirements. The product may be used either orally or parenterally. When used parenterally, the product should be free of any whole or undigested proteins, and even for oral use it is preferable that the product be substantially free of whole proteins.

Although the invention has been described in connection with certain specific embodiments, it will be apparent that various modifications and changes may be made without departing from the spirit and scope of the invention.

I claim:

1. A process of preparing a balanced growth-supporting mixture of protein digestion products from mammalian blood, the mixture being substantially free of undigested proteins, comprising separating the formed elements from the blood, subjecting the remaining portion of the blood to digestion with a proteolytic enzyme until the alpha amino nitrogen content of the mixture is in excess of 40%, the digestion operation being carried out at a temperature and hydrogen ion concentration favorable to the action of the enzyme, heating the digested mixture at a pH of approximately 5.7 to a temperature in the neighborhood of 250° F. until any undigested proteins are coagulated, and separating the insoluble constituents including the coagulated proteins from the mixture.

2. A process of preparing a balanced growth-supporting mixture of protein digestion products from mammalian blood, the mixture being substantially free of undigested proteins, comprising separating the formed elements from the blood, subjecting the remaining portion of the blood to digestion with a proteolytic enzyme until the alpha amino nitrogen content of the mixture is in excess of 40%, the digestion operation being carried out at a temperature and hydrogen ion concentration favorable to the action of the enzyme, heating the digested mixture at a pH of approximately 5.7 to denature and coagulate the undigested proteins, and separating the insoluble constituents including the coagulated proteins from the mixture.

3. A process of preparing a balanced growth-supporting mixture of protein digestion products from mammalian blood, the mixture being substantially free of undigested proteins, comprising separating the formed elements from the blood, subjecting the remaining portion of the blood to digestion with a proteolytic enzyme until the alpha amino nitrogen content of the mixture is in excess of 40%, the digestion operation being carried out at a temperature and hydrogen ion concentration favorable to the action of the enzyme, heating the digested mixture at an acidic pH to denature and coagulate the undigested proteins, and separating the insoluble constituents including the coagulated proteins from the mixture.

NAURICE M. NESSET.

No references cited.